Jan. 4, 1949.       H. E. WARREN       2,458,325

PRIME MOVER DYNAMO PLANT WITH SPEED GOVERNOR

Filed Aug. 20, 1946       2 Sheets-Sheet 1

INVENTOR
Henry E. Warren
BY Geo. K. Woodworth
ATTORNEY

Patented Jan. 4, 1949

2,458,325

UNITED STATES PATENT OFFICE 2,458,325

PRIME MOVER DYNAMO PLANT WITH SPEED GOVERNOR

Henry E. Warren, Ashland, Mass.

Application August 20, 1946, Serial No. 691,742

15 Claims. (Cl. 290—4)

This invention relates to speed governors and more especially to such governors for controlling turbines or other prime movers which drive the alternating current generators of large power systems.

For the control of large power systems, in which numerous types of prime movers drive a number of alternating current generators located in many separate plants which are connected by tie lines for synchronous operation, it is extremely desirable that individual governors be so constructed that they are free from regions of insensitivity near their neutral positions (what is known in the art as "dead bands"), and at the same time may be readily affected or biased by devices responsive to such things as, for example, tie line loads, integrated frequency errors, and the gate position of other generating units.

It is therefore, the principal object of my invention to provide a speed governor wherein the frequency of a generating system having a large number of prime movers driving a plurality of alternating current generators connected by tie lines for synchronous operation can be maintained substantially constant with an extremely high degree of precision, wherein no dashpot with its complicated accessories is required to permit stable operation without speed variations, wherein no appreciable "dead bands" exist, and wherein response to auxiliary devices is obtained with great exactness and reliability. By means of my invention, such a system, the several units of which are controlled in the manner hereinafter set forth, can automatically maintain the output frequency, the proper distribution of varying loads of several units, and accurate time service, with an exceedingly high degree of precision.

Other objects of the invention and the means whereby they are attained will appear from the following detailed description of an embodiment thereof that has given good results in practice.

Figure 1:
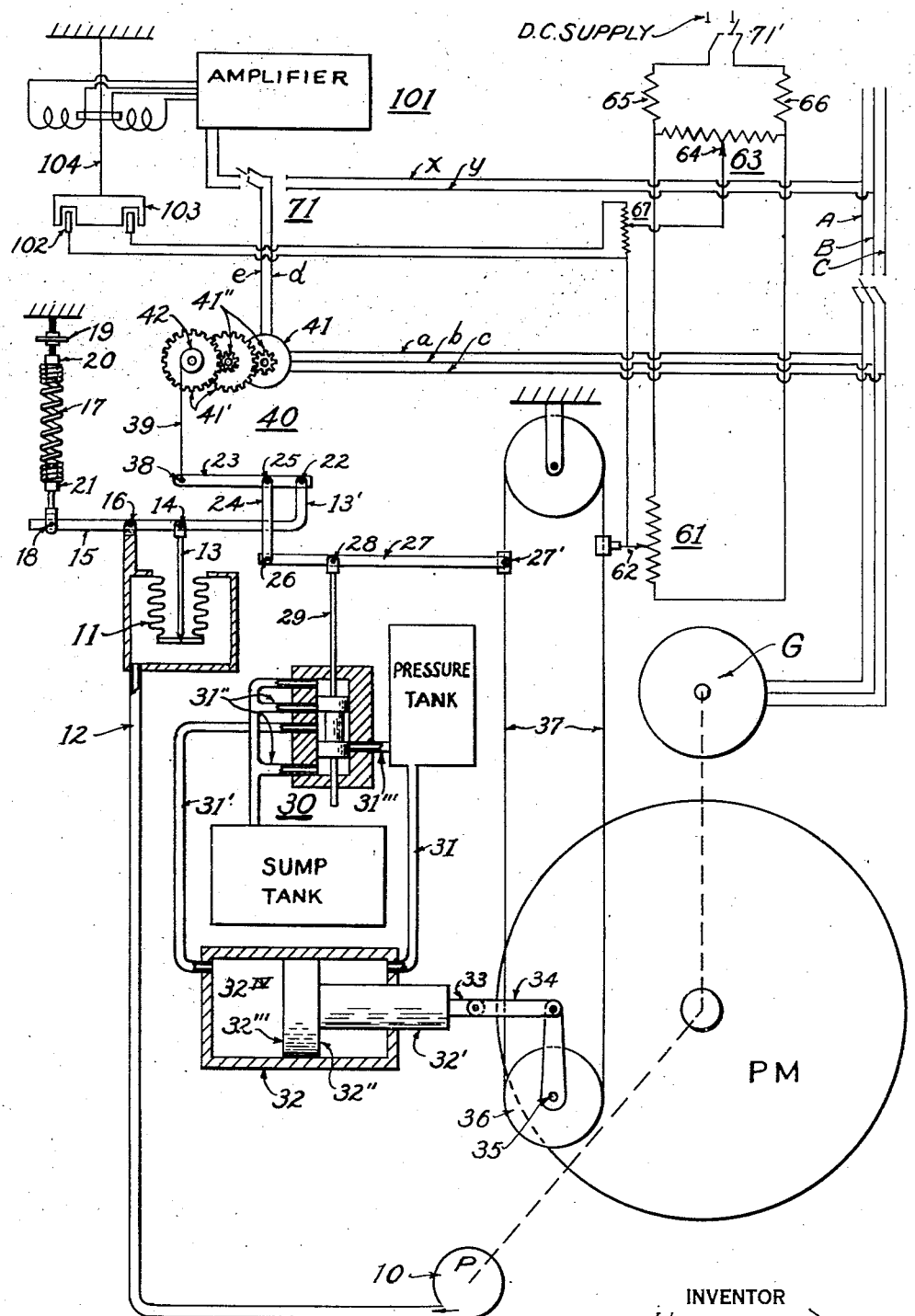
Figure 1 is a diagrammatic representation of a speed governor embodying my invention.

In the particular drawings selected for more fully explaining the principles underlying my invention, and which will be considered as illustrative, merely, and not restrictive, 10 represents a speed measuring centrifugal pump preferably driven directly from the prime mover PM; 11 is a metal bellows or sylphon for the purpose of converting the pressure variations in connecting pipe 12 into magnified force variations on a stem 13 pivoted at 14 to a lever 15, which lever has a stationary fulcrum at 16. The force on the stem 13 is opposed by an adjustable spring 17 pivoted at 18 to said lever, and provided with an adjusting nut 19 and threaded couplings 20 and 21, for the purpose of varying the extension and scale of said spring. An extension 13' of the lever 15 carries the fulcrum point 22 for a lever 23 which is connected by a link 24 to the floating lever 27 near one end thereof, said link being pivoted to lever 23 at fulcrum point 25 and to lever 27 by the pin 26, while at fulcrum 28 is attached to lever 27 by stem 29, a regulating valve 30, preferably a balanced valve such, for example, as described in my Patent No. 2,391,531, December 25, 1945. This valve is of the conventional three-way type, and accordingly ports oil through the connecting pipe 31' to a servomotor 32, which is shown as having a differential piston 32', on the smaller face 32" of which a constant pressure is at all times maintained by the oil or other fluid in the pressure tank by way of the pipe 31, while the other and much larger face 32''' thereof is subjected to variable pressure by way of the pipe 31' and valve 30.

The servomotor is connected through piston rod 33 and link 34 to gate shaft 35 which controls power developed by turbine PM or other prime mover. To gate shaft 35 is secured a sheave or drum 36 which transmits so called restoring motion through cable 37 to floating lever 27. Mounted in proper relationship to lever 23 and connected to said lever at fulcrum point 38 by a belt or cable 39 is a frequency comparing device 40 of the electric motor type which may consist of the well known "Selsyn" motor 41 connected by gears 41' and pinions 41" to drive the drum 42.

This frequency comparing device, one form of which, now commonly called a "Selsyn," is shown in Patent No. 684,579, October 15, 1901, consists of a stator and a rotor, one of which receives current through the leads $a$, $b$, $c$, from the generator G under control, and the other, (usually when switch 71 is closed to the left) alternating current through the leads $d$, $e$, from a standard frequency generator, which is preferably under the control of an accurate frequency generating device, such as is described in my Patent No. 2,260,847, and indicated in Figure 1 at 101.

The frequency comparing device would preferably have a rotating or polyphase magnetic field for its stator and a single phase magnetic field for its rotor. If the frequency in the stator and rotor are the same, the rotor will tend to remain in a fixed position, but if the frequency of the two supplies varies ever so little, the rotor will rotate with a speed measured exactly by the difference in frequency between them and either clockwise or counterclockwise, according to which is the faster.

Any rotary motion of this rotor will be transmitted through the speed-reducing gear train 41', 41'', to the drum 42 which will thus tend to raise or lower lever 23. Such movement transmitted through link 24 and floating lever 27 will raise or lower the regulating valve 30, thus causing the servomotor piston 32' to be moved so as to increase or diminish the output of the turbine, the motion of said piston being in a direction to correct any error in speed of the system as compared with the frequency standard 101 acting on the comparator 40.

The coil 102 which forms part of the frequency standard 101 is so arranged that a small direct current passing through it, by interaction with the field of the powerful permanent magnet 103 which serves as the tensioning weight of the vibrating wire 104, causes an increase or decrease (according to its direction) in the tension in said wire, thus changing the frequency of the generated current, as more fully explained in my Patent No. 2,260,847. Current is supplied to this coil 102 from a direct current source through the current limiting resistances 65. 66, and the potentiometers 61 and 63. Potentiometer 61 is operated by cable 37 through connector 62. Potentiometer 63 may be set by hand, or by a device sensitive to anything whatever which it is desired to have affect the gate position of the prime mover being governed. Potentiometer or shunt 67 is interposed between the coil 102 and the source of current in order to control the effect on frequency of any given relative motion of the potentiometers 61 and 63.

Switch 71 is provided so that, in starting up the prime mover and generator being governed, the system A, B, C, to which the said generator is to be connected may be substituted for the frequency standard as a source of current for the rotor of the frequency comparing device 41, as indicated by the leads x, y. This results in the frequency of the generator G being brought into substantial synchronism with that of said system.

In practice, the machine shown in Fig. 1 will act as an adequately speed-sensitive governor with the point 38 fixed, as it would be when the switch 71 is open, as shown in Fig. 1, and the frequency comparing device with its controls is completely inoperative. Under these circumstances, operation is as follows:

Any load change on the prime mover results in a change of speed, and a corresponding change of pressure in the pipe 12; this produces a change in the force opposed to spring 17 by the bellows 11 acting through lever 15: the lever 15 accordingly assumes a new position, in which the valve 30 connects pipe 31' with either pipe 31'' or pipe 31''', the former, if the speed change is an increase, and the latter, if it is a decrease; oil can then flow into or out of the chamber 32$^{iv}$, moving the piston 32' and the gate shaft 35. The motion of the gate shaft, through sheave 36 and cable 37 moves the end 27' of the lever 27 so as to move in a direction opposite to that in which it was moved by the change in position of lever 15, thus restoring the valve 30 to its neutral position, and halting motion of the piston 32'.

The net result is twofold. The gates of the prime mover have assumed a different position, and the tension in spring 17 has changed. Due to the latter effect, a different pressure on the bellows 11 is now required to hold it in equilibrium with spring 17, and, therefore, the speed of the prime mover which controls this pressure is also different. The amount of this speed difference is determined by the amount of motion required to make the series of operations just described stable, and varies with numerous different factors dependent on the speed of action of the valve, the design of the prime mover and generator, etc. It can be made as large as necessary under the conditions of any given installation by adjusting the effective length of spring 17 by means of the threaded ends 20, 21, or by changing the positions of some or all of the points 16, 18, 14, 25, and 28 along the levers. Thus, compensation for load changes is made stably, but speed is not maintained exactly constant, the speed decreasing by a small amount as the load increases. This variation commonly known as speed droop might, under unfavorable conditions, reach, say, 15%. If now the point 38 is freed, and the frequency comparator 40 with its associated equipment (except that the direct current supply is disconnected from the coil 102 by switch 71') is put in operation, this speed difference at different loads may be eliminated. The action is then as follows:

Any speed change, such as that resulting from the above described load variation, will cause the frequencies in the two windings of the frequency comparator 41 to be different, provided, of course, that adjustments were correct before the load change in question occurred. As a result, the rotor of the comparator 41 will rotate; this rotation, communicated to the drum 42 by the gear train, will cause the belt 39 to roll or unroll on the drum 42, thus raising or lowering the end 38 of the lever 23, and moving the valve; the slow motion of the valve due to this cause produces the same effect on the gates of the prime mover as a motion of the valve (in the same direction) due to the bellows, and the same reclosing to neutral due to motion of the cable 37 takes place, so that this action is stable also. But now the only position at which the mechanism can remain undisturbed is that at which the speed of the prime mover PM is identically that of the frequency standard. In actual operation, the two series of motions, considered separately above, take place simultaneously. The result is isochronous operation, that is, the frequency is the same for all loads and is always that of the frequency standard except during the intervals when corrections are in progress.

For use with units which are to operate in parallel with others on a system, the direct current supply to the coil 102 is connected by closing switch 71'. The above described sequence of operations upon the occurrence of a load change is then modified as follows:

When the cable 37 moves as a result of motion of the gate shaft 35, the slider 62 also moves. Assuming in the beginning of this operation that the potential of the slider 62 on potentiometer 61 was the same as the potential of slider 64 on potentiometer 63, then any rotation of the gate shaft 35 would produce a corresponding raising or lowering of the position of slider 62 which would, of course, result in a current flowing between the sliders 62 and 64 through the coil 102. Such a current would produce a proportional magnetic force acting with or against gravity on the tensioning weight 103. This would have a proportional effect upon the frequency of the vibration of the wire 104. When the frequency of vibration of the wire 104 had been brought by this process to exactly equal the system frequency there would be equilibrium and no further motion of the frequency comparator 41. Therefore, the servomotor would stand at rest and the generator under control would continue to deliver constant output. If the station operator desired to change this output he would alter the position of slider 64 on potentiometer 63 which would result in immediately altering the frequency delivered by vibrator 104 and then the frequency comparator 40 would move in a direction to ultimately restore frequency equilibrium. In so doing, the lever 23 would be moved and the servomotor would ultimately assume a new position with a corresponding change in the output of the prime mover PM. Therefore, the position of the slider 64 can serve as an indicator of the output of the prime mover when the system frequency is normal.

In the case of an initial increase of load, which would cause an eventual decrease in speed if the point 38 were fixed, the effect of the current in coil 102 is to decrease the frequency applied to the rotor; this decreases the frequency difference between the two windings of comparator 41 and diminishes the rate of compensation for speed error by said frequency comparator. If the unit being governed were running isolated, the effect would be to allow operation at different speeds, since the controlling frequency applied to the rotor of frequency comparator 41 would vary according to the position of gate shaft 35. When, however, the unit is synchronized with a system which is running at a frequency determined by control devices (such, for example, as a time error correcting master clock applied to some other unit or units of the system) external to the particular unit being governed, then the effect is to bring the standard frequency generator 101 to the same frequency as that of the system, at a gate position dependent on the setting of potentiometer 63. When this happens, there is no further displacement of valve 30 from its neutral position, and operation continues at that speed and gate position. The function performed by this system of potentiometers is equivalent to that of the so called "paralleling bar" of conventional governors, but is free of errors due to friction or play in the mechanical connections conventionally employed.

Similarly, the frequency-standard frequency-comparator system itself performs a function equivalent to that of the dashpot with its centering springs in conventional governors, but since its standard of reference is actually the frequency, rather than some mechanical position which may or may not have deviated from the proper one (as a result of friction, play, temperature changes, wear, or other influences) there is no frequency error and no dead band.

Since it is desirable to have some control over the magnitude of the effect produced by the potentiometer 61, notably in order to match the relative changes in generation produced in several similar units by a given load change, the shunt 67 is provided to divert from the coil 102 any desired proportion of the current derived from the potentiometer 61.

Figure 2:
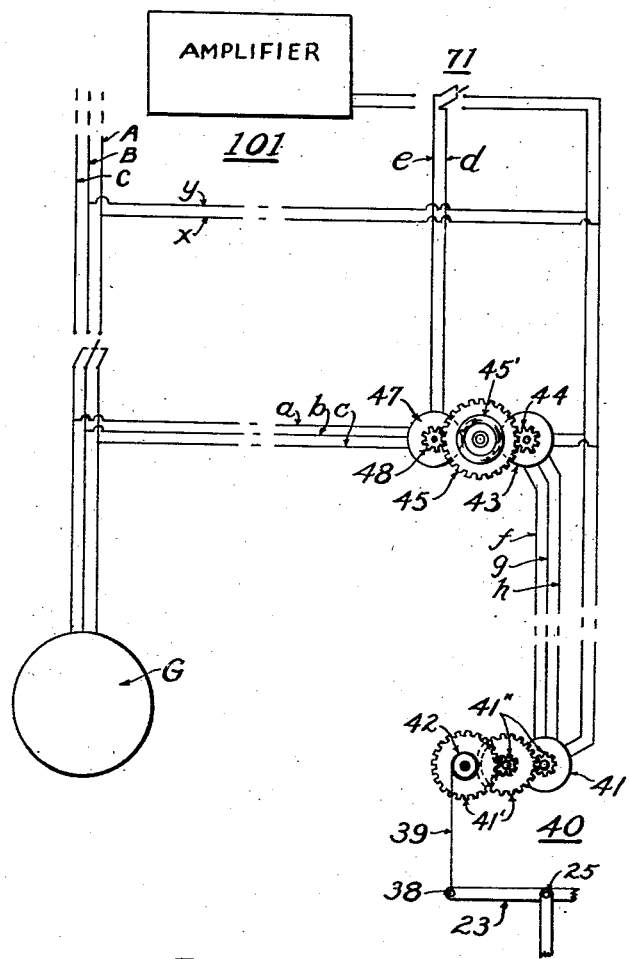
Fig. 2 is a diagram of a remote control system that may be employed in connection with my governor.

As shown in Fig. 2, the motion of the Selsyn frequency comparator 41 in Fig. 1 is derived from Selsyn generator 43 which may be located at a distant switchboard, with lines $f$, $g$, $h$, $x$, $y$, connecting the two Selsyn machines 41 and 43, and the lines $a$, $b$, $c$, from the generator G transferred to Selsyn frequency comparator 47 which is geared to Selsyn generator 43 through the pinion 46, the gear 45, and the pinion 44. Handwheel 45' is provided on gear 45 so that Selsyn generator 43 may be operated by hand when desired. The operation in this case is identical with that described in connection with Fig. 1.

In addition to being used for synchronizing, as hereinbefore described, the switch 71 may be used, once the unit being governed is connected to the system, to connect the rotor of the comparator 41 (Fig. 1) or the rotor of the comparator 47 (Fig. 2), to the system through the leads $x$, $y$, said switch and the leads $e$, $d$, whereupon the rotor of the comparator so connected can no longer turn and the mode of operation will be the same as that above described for the system shown in Fig. 1 when the switch 71 is closed to the right and the point 38 is fixed. This may be desirable in case the operating conditions are such that economies may be achieved by having the generator being governed hold an approximately constant load, while still under the control of a speed sensitive device adequate to prevent overspeed or run-away.

Figure 3:
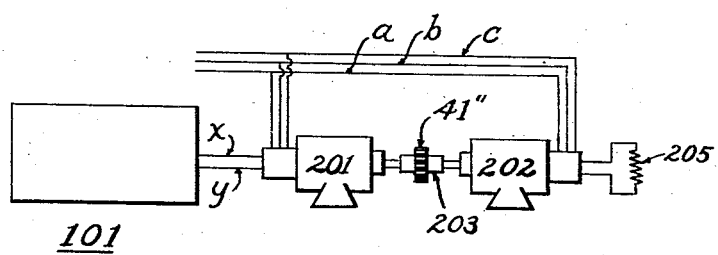
Fig. 3 is a diagram showing a modification.

Figure 3 illustrates a refinement which may be used in case it is desired to operate the frequency comparator at three-phase voltages whose values approach those at which a Selsyn device runs as an induction motor independently of the single phase rotor supply. Two Selsyn machines, 201, 202, are used, rigidly coupled together by the sleeve 203, so that they cannot rotate independently of each other. The stator winding of Selsyn 201 is wired to the three phase supply lines so that its induction motor torque tends to make it rotate, say, clockwise, when viewed from its own shaft end; Selsyn 202 also has its stator so wired to the same lines as to tend to rotate clockwise when viewed from its own shaft end; thus, the induction motor torques, with the machine shafts coupled by sleeve 203, oppose each other, and there is no tendency for the combination to run as induction motors regardless of the magnitude of the three phase voltages. The rotor of Selsyn 201 is connected to the single phase output of the frequency standard 101; the rotor of Selsyn 202 is short circuited through a suitable electrical impedance 205. When there is a difference in frequency between the three-phase and the single phase supplies, Selsyn 201 tends to rotate at a speed proportional to this difference as before described; Selsyn 202 not being connected to any single phase supply is not affected; the combination of the two Selsyns, therefore, rotates at the desired speed. In this case, the pinion 41'' of Fig. 1 will be mounted on and rigidly secured to the sleeve 203.

Having thus described illustrative embodiments of my invention, without, however, limiting the same thereto, what I claim and desire to secure by Letters Patent is:

1. In a power system having a plurality of prime movers driving a multiplicity of alternating current generator units connected by tie lines for synchronous operation, a governor for controlling the speed of an alternating current generator unit to maintain the output frequency thereof approximately constant, in combination with a standard frequency generator, a Selsyn actuated by the alternating current of the generator being governed and the alternating current of said standard frequency generator, means connecting said Selsyn to said governor for biasing the latter to eliminate variances between the frequency of the current of the generator being governed and the current of said standard frequency generator, and switch means for disconnecting said Selsyn from the standard frequency generator and connecting the same to the system to be fed by the generator being governed.

2. In a power system having a plurality of prime movers driving a multiplicity of alternating current generator units connected by tie lines for synchronous operation, a governor for controlling the speed of an alternating current generator unit to maintain the output frequency thereof approximately constant, in combination with a standard frequency generator, a Selsyn distantly located from the generator being governed, a second Selsyn, means mechanically coupling said second Selsyn to the distantly located Selsyn, means connecting said standard frequency generator and the generator being governed to the respective windings of said distantly located Selsyn, a third Selsyn located in the vicinity of the generator being governed, means connecting said third Selsyn to said governor for biasing the latter to eliminate variances between the frequency of the current of the generator being governed and the current of said standard frequency generator, electrical means operatively coupling said third Selsyn for actuation by said second Selsyn, and means for actuating said second Selsyn manually.

3. In a power spstem having a plurality of prime movers driving a multiplicity of alternating current generator units connected by tie lines for synchronous operation, a governor for controlling the speed of an alternating current generator unit to maintain the output frequency thereof approximately constant, in combination with a standard frequency generator, a Selsyn distantly located from the generator being governed, a second Selsyn, means mechanically coupling said second Selsyn to the distantly located Selsyn, means connecting said standard frequency generator and the generator being governed to the respective windings of said distantly located Selsyn, a third Selsyn located in the vicinity of the generator being governed, means connecting said third Selsyn to said governor for biasing the latter to eliminate variances between the frequency of the current of the generator being governed and the current of said standard frequency generator, and electrical means operatively coupling said third Selsyn for actuation by said second Selsyn.

4. In a power system having a plurality of prime movers driving a multiplicity of alternating current generator units connected by tie lines for synchronous operation, a governor for controlling the speed of an alternating current generator unit to maintain the output frequency thereof approximately constant, in combination with a standard frequency generator, a frequency comparing device actuated by the current of the generator being governed and the current of said standard frequency generator, means connecting said frequency comparing device to said governor for biasing the latter to eliminate variances between the frequency of the current of the generator being governed and the current of said standard frequency generator, and means for substituting for the current of said standard frequency generator the current of the system to which the generator being governed is to be connected as a source of current for one of the elements of said frequency comparing device, whereby the frequency of the generator being governed in starting up may be brought into substantial synchronism with that of said system.

5. In a power system having a plurality of prime movers driving a multiplicity of alternating current generator units connected by tie lines for synchronous operation, a governor for controlling the speed of an alternating current generator unit to maintain the output frequency thereof approximately constant, in combination with a standard frequency generator, electromagnetic means for varying the frequency of said standard frequency generator, means controlled by the input to the generator being governed for varying said electromagnetic means, a frequency comparing device actuated by the current of the generator being governed and the current of said standard frequency generator, and means connecting said frequency comparing device to said governor for biasing the latter to eliminate variances between the frequency of the current of the generator being governed and the current of said standard frequency generator.

6. In a power system having a plurality of prime movers driving a multiplicity of alternating current generator units connected by tie lines for synchronous operation, a governor for controlling the speed of an alternating current generator unit to maintain the output frequency thereof approximately constant, said generator unit having a gate shaft operated by said governor, in combination with a standard frequency generator, electromagnetic means for varying the frequency of said standard frequency generator, a frequency comparing device actuated jointly by said generator being governed and said constant frequency generator, two potentiometers, a direct current source connected across the terminals of said potentiometers, movable means connecting portions of the resistances of said potentiometers into a series circuit with said electromagnetic means, gate operated means for varying the portion of the resistance of the first of said potentiometers that is included in said series circuit, and manually operated means for varying the portion of the resistance of the second potentiometer that is included in said series circuit.

7. In a power system having a plurality of prime movers driving a multiplicity of alternating current generator units connected by tie lines for synchronous operation, a governor for controlling the speed of an alternating current generator unit to maintain the output frequency thereof approximately constant, said generator unit having a gate shaft operated by said governor, in combination with a standard frequency generator, electromagnetic means for varying the frequency of said standard frequency generator, a frequency comparing device actuated jointly by said generator being governed and said constant frequency generator, two potentiometers, a direct current source connected across the terminals of said potentiomenters, movable means connecting portions of the resistances of said potentiometers into a series circuit with said electromagnetic means, gate operated means for varying the portion of the resistance of the first of said potentiometers that is included in said series circuit, manually operated means for varying the portion of the resistance of the second potentiometer that is included in said series circuit, and an adjustable resistance shunt interposed between said direct current source and said electromagnetic means for controlling the effect on the frequency of any given relative position of said potentiometers.

8. In a power system having a plurality of prime movers driving a multiplicity of alternating current generator units connected by tie lines for synchronous operation, a governor for controlling the speed of an alternating current generator unit to maintain the output frequency thereof approximately constant, said unit having a turbine and a turbine gate, in combination with a standard frequency generator, electromagnetic means for varying the frequency of said standard frequency generator, gate operated means for varying said electromagnetic means, manually operated means for varying said electromagnetic means, a frequency comparing device actuated by the current of the generator being governed and the current of said standard frequency generator, and manually operated means for controlling the effect on the frequency of the generator being governed of varying said electromagnetic means.

9. An isochronous governor for controlling the speed of an alternating current generator unit to maintain the output frequency thereof substantially constant irrespective of differences in load, said unit having a turbine and a turbine gate, comprising in combination centrifugal means controlled by the speed of the generator being governed, a standard frequency generator, a frequency comparing device actuated by the current of the generator being governed and the current of said standard frequency generator for biasing the governor in the same direction as said centrifugal means, means connecting said frequency comparing device to said centrifugal means for biasing the latter to eliminate variances between the frequency of the current of the generator being governed and the current of said standard frequency generator, gate actuated means for augmenting or diminishing the action on said governor of said frequency comparing device and said centrifugal means, and other gate actuated means for augmenting or diminishing the action on said frequency comparing device of said standard frequency generator.

10. An isochronous governor for controlling the speed of an alternating current generator unit to maintain the output frequency thereof substantially constant irrespective of differences in load, said unit having a turbine and a turbine gate, comprising in combination centrifugal means controlled by the speed of the generator being governed, a standard frequency generator, a frequency comparing device actuated by the current of the generator being governed and the current of said standard frequency generator for biasing the governor in the same direction as said centrifugal means, means connecting said frequency comparing device to said centrifugal means for biasing the latter to eliminate variances between the frequency of the current of the generator being governed and the current of said standard frequency generator, gate actuated means for augmenting or diminishing the action on said governor of said frequency comparing device and said centrifugal means, other gate actuated means for augmenting or diminishing the action on said frequency comparing device of said standard frequency generator and adjustable resilient means opposing the biasing effect of said centrifugal means.

11. An isochronous governor for controlling the speed of an alternating current generator unit to maintain the output frequency thereof substantially constant irrespective of differences in load, said unit having a turbine and a turbine gate, comprising in combination a standard frequency generator, a frequency comparing device actuated by the current of the generator being governed and the current of said standard frequency generator, a regulating valve, speed measuring means controlled by the speed of the generator being governed, means connecting said valve for movement in a given direction by the force developed by said speed measuring means, means connecting said valve for movement in said direction by said frequency comparing device, gate-actuated means for augmenting or diminishing the movement imparted to said valve by said speed measuring means and said standard frequency comparing device and other gate actuated means for augmenting or diminishing the action on said standard frequency comparing device of said standard frequency generator.

12. An isochronous governor for controlling the speed of an alternating current generator unit to maintain the output frequency thereof substantially constant irrespective of differences in load, said unit having a turbine and a turbine gate, comprising in combination centrifugal means controlled by the speed of the generator being governed, a standard frequency generator, a frequency comparing device actuated by the current of the generator being governed and the current of said standard frequency generator for biasing the governor in the same direction as said centrifugal means, means connecting said frequency comparing device to said centrifugal means for biasing the latter to eliminate variances between the frequency of the current of the generator being governed and the current of said standard frequency generator, gate actuated means for augmenting or diminishing the action on said governor of said frequency comparing device and said centrifugal means, other gate actuated means for augmenting or diminishing the action on said frequency comparing device of said standard frequency generator and switch means for disconnecting said frequency comparing device from the standard frequency generator and connecting the same to the system to be fed by the generator being governed.

13. An isochronous governor for controlling the speed of an alternating current generator unit to maintain the output frequency thereof substantially constant irrespective of differences in load, said unit having a turbine and a turbine gate, comprising in combination centrifugal means controlled by the speed of the generator being governed, a standard frequency generator, a frequency comparing device actuated by the current of the generator being governed and the current of said standard frequency generator for biasing the governor in the same direction as said centrifugal means, means connecting said frequency comparing device to said centrifugal means for biasing the latter to eliminate variances between the frequency of the current of the generator being governed and the current of said standard frequency generator, gate actuated means for augmenting or diminishing the action on said governor of said frequency comparing device and said centrifugal means, other gate actuated means for augmenting or diminishing the action on said frequency comparing device of said standard frequency generator and means for substituting for the current of said standard frequency generator the current of the system to which the generator being governed is to be connected as a source of current for one of the elements of said frequency comparing device, whereby the frequency of the generator being governed in starting up may be brought into substantial synchronism with that of said system.

14. In a power system having a plurality of prime movers driving a multiplicity of alternating current generator units connected by tie lines for synchronous operation, a governor for controlling the speed of an alternating current generator unit to maintain the output frequency thereof approximately constant, in combination with a standard frequency generator, a Selsyn machine unit, comprising two Selsyn machines rigidly connected together mechanically in such manner as to prevent rotation of said machines independently of each other, each said machine having a stator element and a rotor element, means connecting one of the corresponding elements of each said machine to receive current from the generator to be controlled, means connecting the other of said elements of one only of said machines to a standard frequency generator, the elements of said machines which are connected to the generator to be controlled being wound to produce torques equal in magnitude and opposite in direction, whereby rotation of said machines as induction motors is prevented when the frequency of the generator to be controlled is equal to the frequency of said standard frequency generator, and means connecting said Selsyn machine unit to said governor for biasing the latter to eliminate variances between the frequency of the current of the generator being governed and the current of said standard frequency generator.

15. An isochronous governor for controlling the speed of an alternating current generator unit to maintain the output frequency thereof substantially constant irrespective of differences in load, said unit having a turbine and a turbine gate, comprising in combination centrifugal means controlled by the speed of the generator being governed, a standard frequency generator, a Selsyn actuated by the current of the generator being governed and the current of said standard frequency generator for biasing the governor in the same direction as said centrifugal means, means connecting said Selsyn to said centrifugal means for biasing the latter to eliminate variances between the frequency of the current of the generator being governed and the current of said standard frequency generator, gate actuated means for augmenting or diminishing the action on said governor of said Selsyn and said centrifugal means, and other gate actuated means for augmenting or diminishing the action on said Selsyn of said standard frequency generator.

HENRY E. WARREN.

REFERENCES CITED

The following references are of record in the file of this patent:

UNITED STATES PATENTS

| Number | Name | Date |
|---|---|---|
| 1,448,409 | Kindl | Mar. 13, 1923 |
| 1,450,620 | Warren | Apr. 3, 1923 |
| 1,633,167 | Davis | June 21, 1927 |
| 1,731,264 | Potter | Oct. 15, 1929 |
| 1,740,078 | Earle | Dec. 17, 1929 |
| 1,761,797 | Pfau | June 3, 1930 |
| 1,824,692 | Skinkle | Sept. 22, 1931 |
| 1,851,790 | Warren | Mar. 29, 1932 |
| 1,934,632 | Taylor | Nov. 7, 1933 |